Sept. 5, 1933.  S. JOHNSON, JR., ET AL  1,925,762
SWITCH

Filed Dec. 9, 1931

Inventor
Stephen Johnson, Jr.
and Stephen Vorech
BY H O Clayton
ATTORNEY

Patented Sept. 5, 1933

1,925,762

UNITED STATES PATENT OFFICE 1,925,762

SWITCH

Stephen Johnson, Jr., and Stephen Vorech, Pittsburgh, Pa., assignors to Bendix-Westinghouse Automotive Air Brake Company, Pittsburgh, Pa., a corporation of Delaware Application December 9, 1931. Serial No. 579,962

5 Claims. (Cl. 200—83)

This invention relates to an improvement in a stop light adapted to be installed upon a motor vehicle equipped with an air brake system.

It is the principal object of the invention to provide a very simple form of stop light actuating mechanism which is operated at or above a predetermined pressure in the air brake lines to thereby operate the light and indicate to an observer that the brakes of the vehicle are being applied.

In a preferred embodiment of the invention there is provided a switch having but one movable contact, the same being operated with an increase in air pressure within the lines, and further having a fixed contact rigidly secured to the body of the switch.

Other objects of the invention and desirable details of construction and combinations of parts will become apparent from the following detailed description of a preferred embodiment of the invention taken in conjunction with the accompanying drawing, in which.

Figures 2, 3:
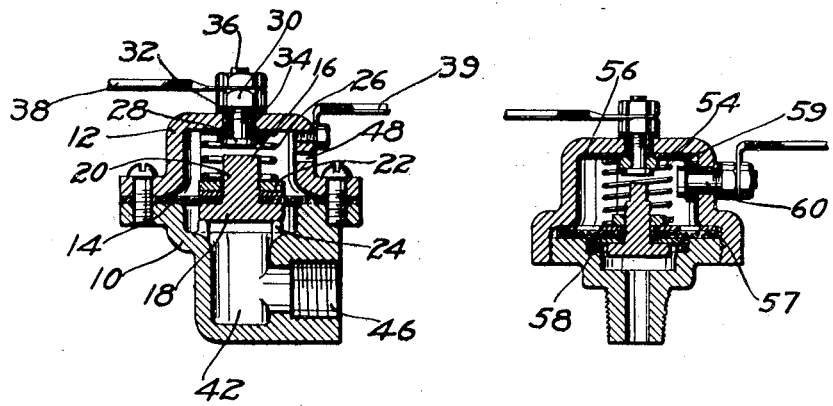
Figure 2 is a sectional view through the air operated switch which constitutes the present invention.
Figure 3 is a sectional view through a slightly modified form of air operated switch.

In that embodiment of the invention selected for illustration and disclosed in detail in Figure 2 there is provided a body member 10 and cover 12 between which is clamped a flexible diaphragm 14 composed of insulating material. A movable contact member 16, comprising a head or stop portion 18 and a threaded shank portion 20, is secured to the central portion of the diaphragm by means of a clamping nut 22, the contact member being normally thrust into engagement with stops 24, integral with the body 10, by means of a compressed spring 26 interposed between the nut 22 and the inner face of the cover 12.

A stationary contact member 28 is secured to the cover 12 by a nut 30 and is insulated from the cover by a fiber washer 32 and fiber bushing 34. The upper end or shank portion 36 of the contact member 28 acts as a binding post to which one lead 38 of the stop light circuit may be attached and the remaining lead 39 may be attached to the cover 12 or grounded to the brake piping system.

Figure 1:
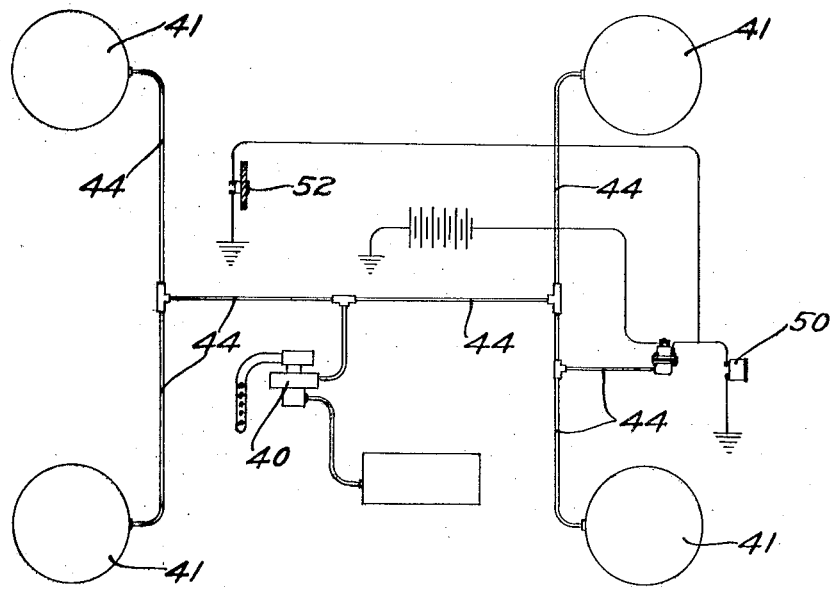
Figure 1 is a diagrammatic view illustrating the application of the invention to a conventional form of automotive air brake system.

Describing now the operation of the invention, actuation of a conventional brake valve 40, Figure 1, to apply the brakes 41 serves to admit air under reservoir pressure to the chamber 42 in the switch, the switch body member 10 being in communication with brake lines 44 via port 46 in the switch. The switch parts, particularly the strength of spring 26 and area of the diaphragm 14, are so calibrated that the diaphragm is moved to bring contacts 16 and 28 into engagement when the vehicle brakes are but slightly applied. The electrical circuit within the switch is thus completed via the contacts 16 and 28, spring 26 and cover 12. A vent opening 48 in the cover facilitates the movement of the diaphragm in this operation.

A stop light 50 is thus rendered operative to apprise the driver of the trailing vehicle of the operation of the brakes on the leading vehicle. If desired, a dash light 52 may be connected in parallel with the stop light 50 to apprise the driver of the leading vehicle of the operation of his brakes.

A very compact and effective air operated stop light switch is thus provided, the relatively few parts of which are protected from the elements by the water and dustproof casing and cover; furthermore, the switch may be installed in any convenient place in the air brake lines.

There is disclosed in Figure 3 a modified form of switch wherein a diaphragm operating spring 54 is insulated from the body of the switch by a non-metallic washer 56. A diaphragm 57 of insulating material is positioned in the body of the switch in any suitable manner. A ring 58 of any suitable insulating material, not only serves as a stop for the diaphragm, but also functions to insulate the movable contact 61 from the body of the switch when the latter is in the "off" position. A metal ring and lug 59 is secured to an insulated terminal 60 in the side of the body of the switch and is contacted by the spring 54. The structure in all other respects is practically identical with that of Figure 2, the circuit being completed via the movable contact member, diaphragm spring 54, lug 59 and terminal 60.

While one illustrative embodiment has been described, it is not my intention to limit the scope of the invention to that particular embodiment, or otherwise than by the terms of the appended claims.

We claim:

1. A fluid operated switch comprising a body portion and a cover portion, the two clamping between them a flexible diaphragm member of insulating material, stops on said body portion, a movable contact member secured to said diaphragm, a spring interposed between said cover portion and contact member to yieldingly urge the latter against the aforementioned stops, said spring being in electrically conductive relationship with said cover portion and said movable contact member, and a stationary contact member secured to said cover portion and positioned in line with the aforementioned contact member whereby flexing of the diaphragm serves to bring said contact members into engagement to render the switch operative for the purpose intended.

2. A fluid operated switch comprising, in combination, a body member, a cover member, a flexible member of insulating material clamped between said aforementioned members, a movable contact member carried by said flexible member, a stationary contact member carried by said cover member and in line with said movable contact member, electrical leads secured to the stationary contact member and to the cover member respectively, and means including a spring for connecting said diaphragm-secured contact member and the lead secured to the cover member in electrically conductive relationship.

3. A fluid operated switch comprising a body member, a cover member, a diaphragm member clamped between said aforementioned members, a contact member secured to said diaphragm member, a terminal member secured to said cover member, an insulating member clamped between said terminal member and cover, a spring interposed between said insulating member and diaphragm, a second terminal member secured to the side of said cover member, and conductor means secured to said second mentioned terminal and contacted by said spring whereby upon the actuation of said diaphragm to bring the contact member into engagement with the first mentioned terminal an electrical circuit is completed through said spring and conductor members.

4. A fluid operated switch comprising a body member, a cover member, an insulating flexible diaphragm clamped between said aforementioned members, a contact carried by said diaphragm, an electrical terminal secured to said cover member, a spring interposed between said cover member and the diaphragm, a second electrical terminal secured to the cover member and insulated from said first terminal, and means including said spring for electrically connecting said second terminal and said diaphragm-carried contact whereby upon the actuation of said diaphragm to bring said last-named contact into engagement with the first-named terminal an electrical circuit is completed through said spring.

5. A fluid pressure operated switch comprising cooperating body and cover members forming a casing having a flexible insulating diaphragm therein, a movable contact carried by said diaphragm, a combined stationary contact and electrical terminal carried by and insulated from said cover member, a second electrical terminal also carried by and insulated from said cover member, said diaphragm-carried contact being adapted to engage said combined stationary contact and electrical terminal when said diaphragm is actuated by fluid under pressure, means including a spring for normally maintaining said contacts disengaged and for electrically connecting said second-named terminal and said diaphragm-carried contact, and means for insulating said diaphragm-carried contact from said casing when the switch is in the "off" position.

STEPHEN JOHNSON, Jr.
STEPHEN VORECH.